A. T. CRANE.
NUT.
APPLICATION FILED APR. 9, 1914.
1,106,082.
Patented Aug. 4, 1914.
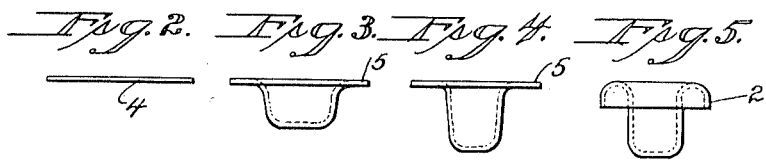
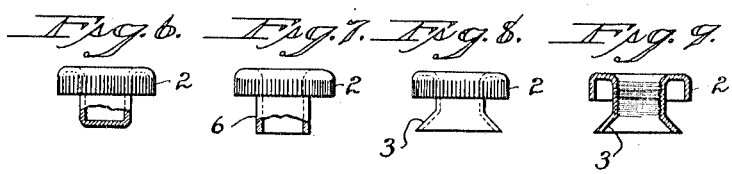

UNITED STATES PATENT OFFICE.

ARTHUR T. CRANE, OF WATERBURY, CONNECTICUT, ASSIGNOR TO WATERBURY MFG. CO., OF WATERBURY, CONNECTICUT, A CORPORATION.

NUT.

1,106,082.     Specification of Letters Patent.     Patented Aug. 4, 1914.

Application filed April 9, 1914. Serial No. 830,688.

*To all whom it may concern:*

Be it known that I, ARTHUR T. CRANE, a citizen of the United States, residing at Waterbury, in the county of New Haven and State of Connecticut, have invented a new and useful Improvement in Nuts; and I do hereby declare the following, when taken in connection with the accompanying drawings and the characters of reference marked thereon, to be a full, clear, and exact description of the same, and which said drawings constitute part of this application, and represent, in—

Figure 1 a side view of a nut constructed in accordance with my invention and shown as applied to a battery screw. Figs. 2 to 9 inclusive show the various steps employed in the production of my improved nut.

This invention relates to an improvement in nuts, and particularly nuts especially designed to be used in electrical work on batteries, bells and other points where a wire is to be connected. These nuts which comprise a head and a flaring base, are usually turned from a rod and when so made are frequently cut off from the bar stock in such a manner as to leave a bur at the edge of the hole at the top of the nut causing the nut to bind on the screw when assembled.

The object of this invention is to construct these nuts from sheet metal, and the invention consists in the construction hereinafter described and particularly recited in the claim.

As shown in Fig. 1 of the drawings, the nuts comprise a head 2 and a flaring base 3. This nut is formed from a flat disk 4 of metal as indicated in Fig. 2. This disk is then struck into cup-shape as shown in Fig. 3, and the cup by a second step is deepened as shown by Fig. 4, although it is conceivable that the blank might be drawn to the form shown in Fig. 4 by a single operation. The flange 5 of the cup is then rolled over as shown in Fig. 5 to form a head 2 and the edge of this head is knurled or otherwise faced so as to be readily turned by the finger or by a wrench. The bottom of the cup is then cut away leaving a long shank 6 as shown in Fig. 7, and this shank is then flared to form a hollow base 3 as shown in Fig. 8, and the interior walls of the shank are then threaded as shown in Fig. 9. I thus form a nut particularly adapted for electric use from sheet metal and furnish the usual head and flaring base, which, being recessed, will accommodate the coil of wire around the screw and hold the same in place thus insuring electrical connection.

I claim:—

A nut formed from sheet metal and comprising a tubular shank provided at one end with a reversely turned flanged head and at the opposite end with a flaring base.

In testimony whereof, I have signed this specification in the presence of two subscribing witnesses.

ARTHUR T. CRANE.

Witnesses:
   J. S. NEAGLE,
   K. M. BROWN.